(12) United States Patent
Galvin, Jr. et al.

(10) Patent No.: US 11,328,093 B1
(45) Date of Patent: *May 10, 2022

(54) PROTECTING SENSITIVE DATA

(71) Applicant: Wells Fargo Bank, N.A., San Francisco, CA (US)

(72) Inventors: Thomas Francis Galvin, Jr., Charlotte, NC (US); James Moffat McGill Hinkle, Lincolnton, NC (US); Victor Manuel Ortiz Del Valle, Charlotte, NC (US); Udayakumar Ramakrishnan, Charlotte, NC (US); Christina M. Hamilton, Tacoma, WA (US); Stuart Edward Lockhart, Vancouver, WA (US); Gregory Scott Woods, Chandler, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/784,041

(22) Filed: Feb. 6, 2020

Related U.S. Application Data

(63) Continuation of application No. 16/229,163, filed on Dec. 21, 2018, now Pat. No. 10,572,685, which is a
(Continued)

(51) Int. Cl.
*G06F 21/62* (2013.01)
*G06F 16/25* (2019.01)
*G06F 16/22* (2019.01)

(52) U.S. Cl.
CPC ...... *G06F 21/6254* (2013.01); *G06F 16/2282* (2019.01); *G06F 16/258* (2019.01)

(58) Field of Classification Search
CPC . G06F 21/6254; G06F 16/2282; G06F 16/258
(Continued)

(56) References Cited

U.S. PATENT DOCUMENTS 8,627,084 B1 * 1/2014 Pauker .................... H04L 9/083
713/171
8,666,823 B2 * 3/2014 Spies ..................... G06Q 20/20
705/16

(Continued)

OTHER PUBLICATIONS

U.S. Appl. No. 15/272,036 U.S. Pat. No. 10,192,072, filed Sep. 21, 2016, Protecting Sensitive Data.
(Continued)

*Primary Examiner* — Michael S McNally
(74) *Attorney, Agent, or Firm* — Schwegman Lundberg & Woessner, P.A.

(57) ABSTRACT

Various examples described herein are directed to systems and methods for securing data. A security system may receive a first record comprising a plurality of record fields, where the plurality of record fields includes a first record field and the first record field includes a first record field data. The security system may access a source setup record corresponding to the first record from a source setup table and determine that the source setup record comprises data referencing the first record field. The security system may access first token data corresponding to the first record field data and replace the first record field data at the first record field with the first token data. The security system may store the first token data at a token table and writing the first token data to the first record field to replace the first record field data.

20 Claims, 8 Drawing Sheets

Related U.S. Application Data continuation of application No. 15/272,036, filed on Sep. 21, 2016, now Pat. No. 10,192,072.

(58) Field of Classification Search
USPC .......................................................... 726/26
See application file for complete search history.

(56) References Cited

U.S. PATENT DOCUMENTS

| | | | |
|---|---|---|---|
| 10,192,072 B1 | 1/2019 | Galvin, Jr. et al. | |
| 2013/0121486 A1* | 5/2013 | Spies | H04L 9/3073 380/30 |
| 2014/0046853 A1* | 2/2014 | Spies | H04L 9/0897 705/51 |
| 2014/0344164 A1* | 11/2014 | Pauker | G06Q 20/3829 705/71 |

OTHER PUBLICATIONS

U.S. Appl. No. 16/229,163, filed Dec. 21, 2018, Protecting Sensitive Data.
"U.S. Appl. No. 15/272,036, Examiner Interview Summary dated Aug. 23, 2018", 3 pgs.
"U.S. Appl. No. 15/272,036, Non Final Office Action dated May 14, 2018", 7 pgs.
"U.S. Appl. No. 15/272,036, Notice of Allowance dated Sep. 14, 2018", 5 pgs.
"U.S. Appl. No. 15/272,036, Preliminary Amendment filed Jan. 31, 2017", 9 pgs.
"U.S. Appl. No. 15/272,036, Response filed Aug. 14, 18 to Non Final Office Action dated May 14, 2018", 13 pgs.
"U.S. Appl. No. 16/229,163, Non Final Office Action dated Jul. 3, 2019", 10 pgs.
"U.S. Appl. No. 16/229,163, Notice of Allowance dated Oct. 21, 2019", 8 pgs.
"U.S. Appl. No. 16/229,163, Preliminary Amendment filed Feb. 14, 2019", (7 pgs.).
"U.S. Appl. No. 16/229,163, Response filed Oct. 3, 19 to Non-Final Office Action dated Jul. 3, 2019", 8 pgs.
"Data Protection and PCI Scope Reduction for Today's Businesses—HPE Secure Stateless Tokenization", Hewlett Packard Enterprise—Business White Paper, (Jan. 2016), 8 pgs.
"HPE Secure Stateless Tokenization", [Online], [Reflecting May 6, 2016], Retrieved from the Internet: <https://web.archive.org/web/20160506233031/https://www.voltage.coom/technology/tokenization-and-key-management/hpe-secure-stateless-tokenization/, (Accessed Dec. 5, 2017), 4 pgs.
"Voltage Secure Stateless Tokenization", Voltage Security Inc., (2013), 7 pgs.
Rashid, Fahmida Y., "Voltage Security Launches 'Stateless' Tokenization Solution", Security Week, [Online], [Accessed Dec. 5, 2017]. Retrieved from the Internet: <URL: http://www.securityweek.com/voltage-security-launches-stateless-tokenization-solution>, (Dec. 19, 2012), 5 pgs.

* cited by examiner

PROTECTING SENSITIVE DATA

CROSS-REFERENCE TO RELATED APPLICATION

This application is a continuation of U.S. patent application Ser. No. 16/229,163, filed on Dec. 21, 2018, which is a continuation of U.S. patent application Ser. No. 15/272,036, filed Sep. 21, 2016, now issued as U.S. Pat. No. 10,192,072, which is incorporated by reference herein in its entirety.

TECHNICAL FIELD

Embodiments described herein generally relate to systems and methods configuring a computer system to efficiently secure sensitive data for processing.

BACKGROUND

Many types of routine data processing use sensitive data such as, for example, credit card numbers, social security numbers, etc. Sensitive data can be susceptible to hacking, for example, to perpetrate identity theft and for other reasons. Hacking of sensitive information can cause harm to users whose personal data is stolen and embarrassment to business enterprises who processing systems were hacked.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
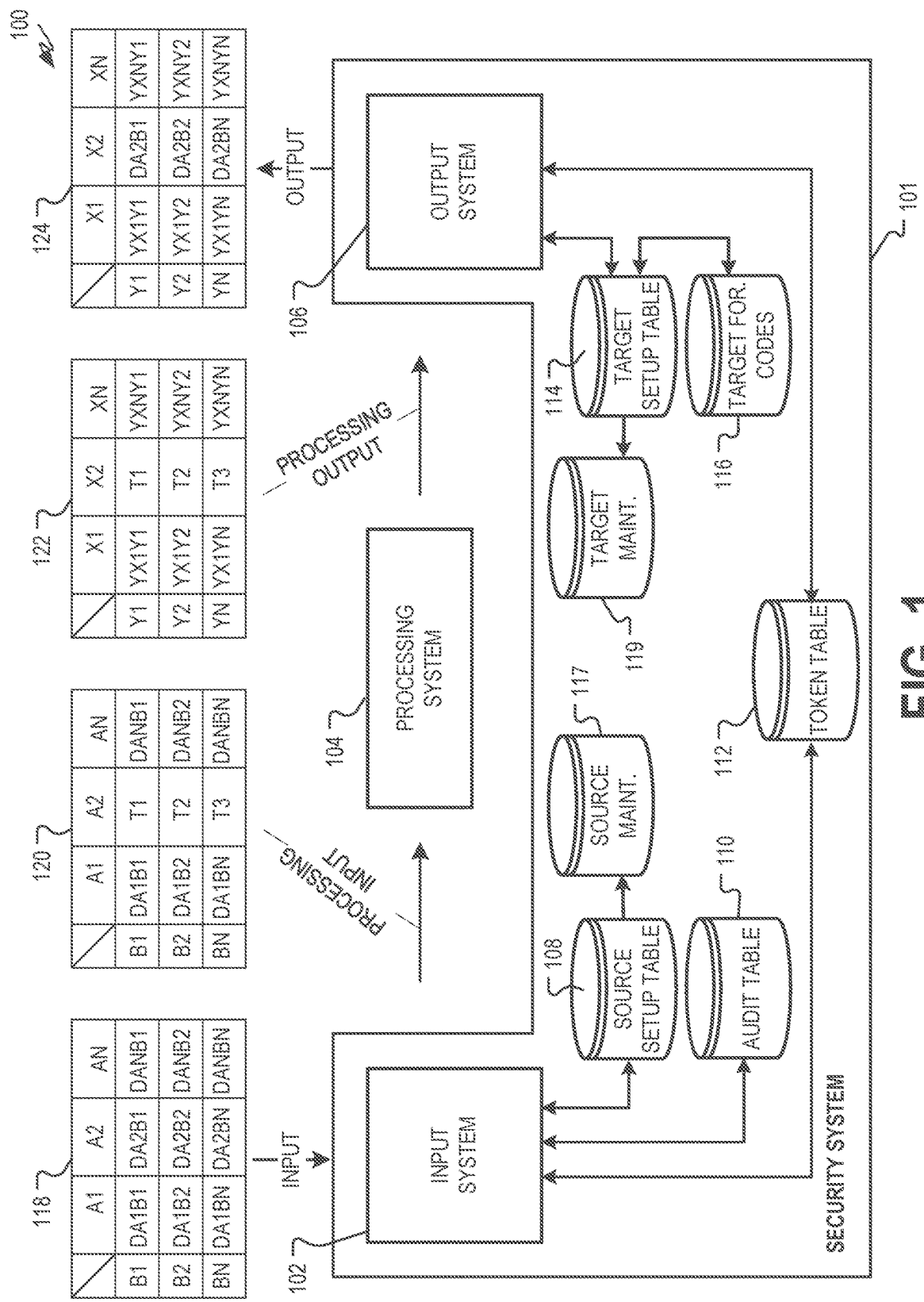
FIG. 1 is a diagram showing one example of an environment for secure data processing including a security system and processing system.

Various examples described herein are directed to systems and methods for securing sensitive data for processing. A security system may tokenize incoming data records by replacing sensitive data units with token data to generate tokenized records. A processing system may perform suitable processing on the tokenized records. Processing tokenized records may reduce the risk of harmful data losses due to hacking. For example, a hacker who hacks the processing system may retrieve non-sensitive data and token data, which may be less harmful than if the hacker were to obtain sensitive data itself. The security system may track record fields that include token data to enable the security system to de-tokenize at a later time. De-tokenizing may include identifying record fields from the processed records that include token data and replacing the token data with the corresponding sensitive data.

The systems and methods described herein may be used for any suitable processing. In some examples, a financial institution may utilize a security system as described herein to provide a financial service such as, for example, an accounts receivable service. The incoming records may be, for example, records of purchases or other transactions that generate accounts receivable. These records may include record fields storing sensitive payment information, such as credit card numbers, sensitive counterparty data, such as Social Security numbers, and/or other sensitive data. The security system may replace record fields including credit card numbers, Social Security numbers, etc. with token data during tokenization.

In another example, the systems and methods described herein may be implemented by a business enterprise to provide human resources processing, such as, for example, payroll processing. For example, incoming records may describe employees or other humans. Record fields may indicate data about the humans such as names, addresses, Social Security numbers, employment history, salary, etc., some of which may be sensitive.

In some examples, the systems and methods described herein may be utilized with data records in any suitable format, including, for example, data records that do not consistently place sensitive data at a common database field. In some examples, the systems and methods described herein may be utilized on a variety of data record formats, sometimes from multiple sources. For example, the systems and methods described herein, in some examples, may be useful in processing systems that aggregate, co-mingle, translate, and/or transform data received from a variety of inconsistent record formats and/or layouts.

In various examples, the security system may utilize various tables to identify sensitive data during tokenization and to identify data tokens after processing for de-tokenization. A source setup table may store a plurality of source setup records. Each source setup record may correspond to a type of incoming record expected to be received by the security system. For example, a source setup record may indicate fields of an incoming data record that include sensitive data, if any, (and therefore should be replaced with token data). An audit data source may include various data describing a record and record field that is to be tokenized. A token data source may include token data that is incorporated into the incoming data records. A target setup table may include target setup records. Each target setup record may correspond to a type of processed record expected to be generated by the processing system, and may indicate record fields at the processed record that include token data and, therefore, are to be de-tokenized.

The systems and methods described herein may provide advantages over alternative configurations. For example, utilizing the tables described may enable the identification of record fields in different formats and from different sources. For example, if records were to be received in a common format, the processing system could be used with a purpose-designed database that applies encryption or other protection technology to specific database columns that correspond to record fields storing sensitive information. In contrast, the systems and methods described herein may be useful for common format records as well as records in different formats from different sources. In some examples, the systems and methods may be used for a processing system that receives records from a number of different systems, such as different legacy systems, different customer systems, etc.

FIG. 1 is a diagram showing one example of an environment 100 for secure data processing including a security system 101 and processing system 104. The security system 101 comprises an input system 102 and an output system 106. The input system 102 may tokenize input records by replacing sensitive data in the input records with token data to generate protected records. The processing system 104 may perform suitable storage and/or processing of the protected records to generate processed records. Processed records, generated from the protected records, may include token data in place of sensitive data. The output system 106 may convert the processed records to output records, for example, by replacing token data at the output records with corresponding sensitive data (e.g., the sensitive data originally removed by the input system 102).

The security system 101 may also include various data tables 108, 110, 112, 114, 116, 117, 119 that may be used by the input system 102 and output system 106 to tokenize and de-tokenize records. Data tables 108, 110, 112, 114, 116, 117, 119 are referred to herein as tables and may, in some examples, make up all or a part of one or more tables in a database schema.

A source setup table 108 may comprise data describing which record fields of input records include sensitive data. For example, the source setup table 108 may include source setup records. A source setup record may identify the record fields of an input record and may indicate which, if any, record fields of an input record include sensitive data that is to be tokenized. A token table 112 may include token records describing tokens introduced into input records by the input system. The token table 112 may be used by the output system 106 during de-tokenization, for example, as described herein. An audit table 110 may include audit records describing each record or record field that is tokenized by the input system 102. An audit record may indicate data about a record or record field such as, for example, a source of the record, an identifier of the tokenized field, the token data written to the tokenized field, etc. In some examples, token records stored at the token table 112 may be configured to expire after a predetermined time (e.g., 7 days, 30 days, 60 days, etc.). When a token record expires, the security system 101 may remove it from the token table 112, for example, by deleting the expired token record or otherwise rendering it unreadable and/or unsearchable. For example, the expiration period for a token record may be approximately the same as the expected time between the receipt of input records and sending out corresponding output records. In this way, the size of the token table 112 may remain relatively small, allowing the output system 106 to more quickly search for token data, as described herein.

A target setup table 114 may include target records that identify the record fields of processed records that are tokenized (e.g., include token data). A target format code table 116 may include format codes describing processed records. For example, format codes may be used to match processed files or records with entries at the target setup data 114 that indicate tokenized record fields. In some examples, the target setup table 114 and the target format code table 116 may be condensed into a single table. In some examples, tables 108, 110, 112, 114, 116, 117, 119 are tables implemented in a common database schema. Although tables 108, 110, 112, 114, 116, 117, 119 are described herein as tables, they may be organized in any suitable data structure. For example, tables 108, 110, 112, 114, 116, 117, 119, may be or include physical data stores, databases, logical files, etc.

FIG. 1 also shows example files 118, 120, 122, 124 illustrating example input records, protected records, processed records, and output records. For example, input file 118 includes input records. The input file 118 may be received, for example, from another computer system such as a customer computer system. In examples where the processing system performs receivables management processing, the input file 118 may include records describing one or more transactions. Any suitable number of records may be included in an input file 118. For example, the input file 118 includes input records B1, B2, BN. Records B1, B2, BN include record fields A1, A2, AN. Although three record fields are shown, records may include any suitable number of record fields. In the example of FIG. 1, the input records B1, B2, BN include record fields A1, A2, AN including various data units. For example, input record B1 includes data unit DA1B1 at record field A1, data unit DA2B2 at record field B2, and data unit DANB1 at data field AN. Input records B1, B2 and BN have similarly indicated data units at the respective data fields A1, A2, A3. Although the input file 118 is shown in tabular format, the input file 118 and input records B1, B2, BN may be arranged in any suitable format.

The input file 118, and the input records B1, B2, BN contained therein, may be processed by the input system 102 to generate a protected file 120. For example, the input system 102 may consult the source setup table 108 to retrieve a source setup record corresponding to the input file 118 and/or to the individual input records B1, B2, BN shown therein. The source setup record may indicate which record fields A1, A2, AN of the input records include sensitive data, such as credit card numbers, social security card numbers, etc. In the example of FIG. 1 record field A2 may include sensitive data. The input system 102 may tokenize the input records included in the input file 118 to generate protected file 120. The protected file 120 includes the same records B1, B2, BN as the input file 118, however, data units at record field A2 are replaced by token data, indicated by T1, T2, and T3, respectively. In some examples, the processing system 104 writes token data T1, T2, and T3 to the token tables. Also, in some examples, the processing system 104 generates an audit record and writes the audit record to the audit table 110.

The protected file 120 may be provided as input to the processing system 104. The processing system 104 may perform various processing on the protected file 120. For example, the processing system 104 may load the protected records into one or more database, modify the protected records, generate new records based on the record fields of the protected records, etc. In an example where the processing system 104 performs receivables management, the protected records may represent transactions. The processing system 104 may modify the protected records to generate new records indicating receivables. In an example where the processing system 104 performs payroll processing, the processing system may receive protected records describing employees and generate records describing checks or direct deposits that should be provided to the employees. For other types of processing, the processing system 104 may perform different tasks.

FIG. 1 shows a processed file 122 including processed records Y1, Y2, and YN. Although three processed records are shown, any suitable number of processed records may be included in a processed file such as processed file 122. Records Y1, Y2, and YN include three record fields X1, X2, XN although, again, any suitable number of record fields may be included. In the example of FIG. 1, tokenized data units T1, T2, T3 are positioned at data field X2 after the processing of the processing system 104.

The processed file 122 may be provided to the output system 106 after processing by the processing system 104. The output system 106 may be programmed to identify record fields that include token data, such as record field X2. For example, the output system 106 may consult the target setup table 114 and/or target format code table 116. The output system 106 my retrieve a target format code corresponding to the processed records Y1, Y2, YN from the target format code table 116. For example, the target format code may indicate a number of record fields, an order of record fields, a type of data expected in record fields, etc. The output system 106 may use the target format code as a key to identify a target setup record for the processed records at the target setup table 114. The target setup record may indicate record fields (such as X1, X2, XN) at the processed file 122 that include tokenized data.

In some examples, the output system 106 may be configured to cross-reference data units at record fields indicated by the target setup table 114 to include token data with the token table 112. In the example of FIG. 1, the output system 106 may search the token table 112 to determine whether the token table 112 includes token data T1, T2, and/or T3. If the token table 112 includes token data T1, T2, and/or T3, then the output system 106 may determine that the data units at record field X2 are, indeed, tokenized. The output system 106 may de-tokenize the data units, for example, by replacing token data T1, T2, T3 with the original sensitive data DA2B1, DA2B2 and DA2BN to generate output records Y1, Y2, YN at an output file 124.

FIG. 1 also shows optional source maintenance table 117 and optional target maintenance table 119. The source maintenance table 117 and target maintenance table 119 may be utilized in some examples, to implement change control at the source setup table 108 and target setup table 114, respectively. For example, modifying a source setup record at the source setup table 108 may affect whether input records are passed to the processing system 104 in tokenized for or in the clear. When a change is proposed to a source setup record at the source setup table, a source setup update record describing the proposed change may be written to the source maintenance table 117 (e.g., by an administrative user). Source setup update records stored at the source maintenance table 117 may be automatically and/or manually reviewed. Review of source setup update records stored at the source maintenance table 117 may occur upon any suitable schedule including, for example, periodically (every day, every three hours, etc.). In some example, review of source setup update records may occur based on the number of such records at the source maintenance table. For example, when the number of un-reviewed records reaches a threshold value, the review may occur. As a result of the review, some setup update records may be accepted. When a setup update record is accepted, the proposed change to the source setup record is made at the source setup table 108. The proposed change may include, for example, generating a new source setup record, deleting an existing source setup record, modifying a source setup record, etc.

In some examples, the target maintenance table 119 may be used in a similar manner. For example, when a change is proposed to a target setup record, a target update record describing the proposed change may be written to the target maintenance record (e.g., by an administrative user). Target setup update records stored at the target maintenance table 119 may be automatically and/or manually reviewed. Review of target setup update records stored at the target maintenance table 119 may occur upon any suitable schedule including, for example, periodically (every day, every three hours, etc.). In some example, review of target setup update records may occur based on the number of such records at the target maintenance table. For example, when the number of un-reviewed records reaches a threshold value, the review may occur. As a result of the review, some setup update records may be accepted. When a setup update record is accepted, the proposed change to the target setup record is made at the target setup table 108. The proposed change may include, for example, generating a new target setup record, deleting an existing target setup record, modifying a target setup record, etc.

Figure 2:
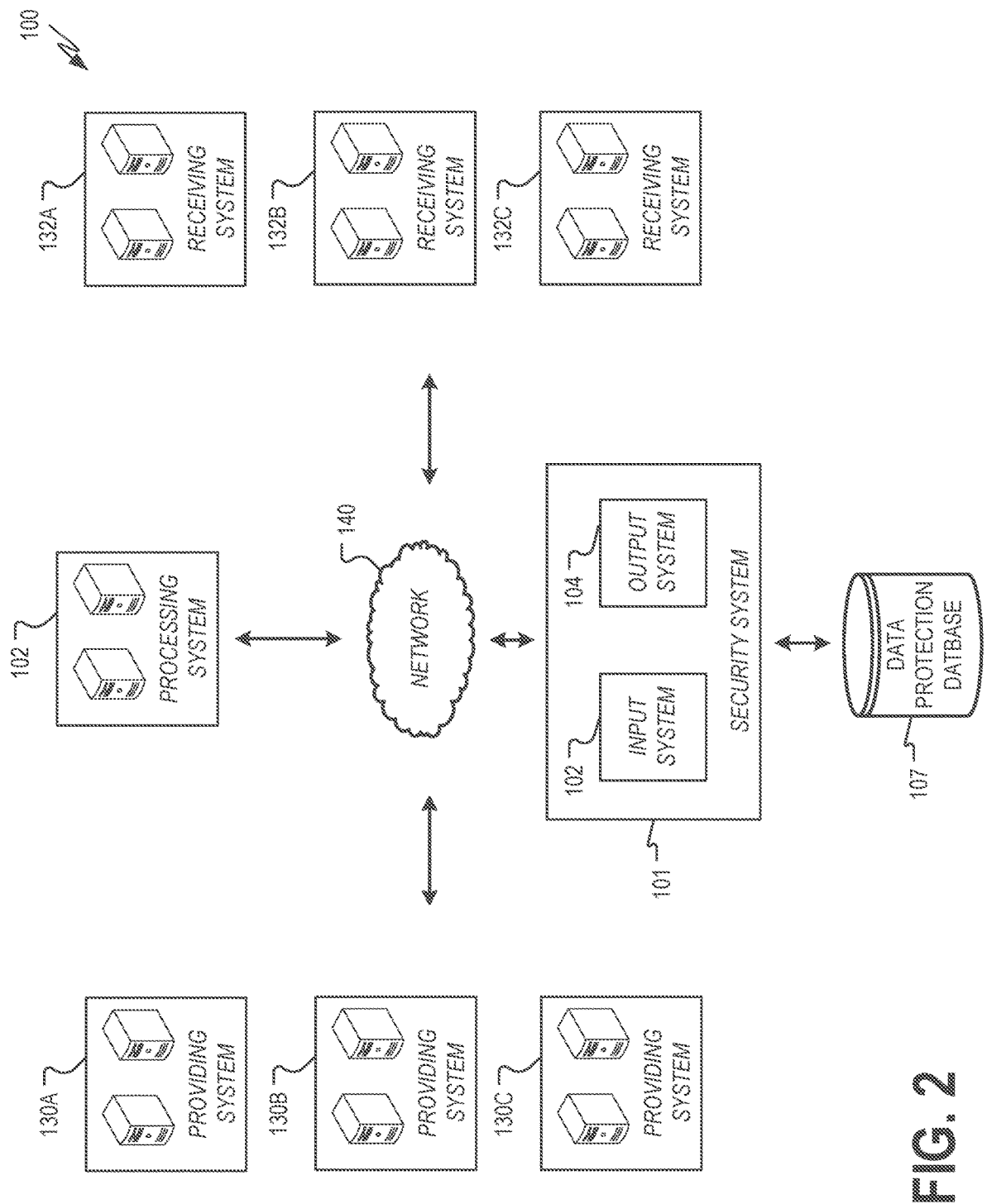
FIG. 2 is a diagram showing one example of the environment of FIG. 1 showing additional components.

FIG. 2 is a diagram showing one example of the environment 100 showing additional components. FIG. 2 illustrates the security system 101 and processing system 102 as well as example providing systems 130A, 130B, 130C, 130C and example receiving systems 132A, 132B, 132C.

The security system 101 may comprise any suitable computing device or devices such as, for example, one or more servers, at a single geographic location and/or distributed across multiple geographic locations. Similarly, the processing system 102 may comprise any suitable computing device or devices, such as, for example, servers, at a single geographic location and/or distributed across multiple geographic locations. In some examples, the security system 101 and processing system 104 may be executed by the same server or set of servers. FIG. 2 also shows input system 102 and output system 104. The systems 102, 104 may be implemented utilizing any suitable combination of hardware or software. In some examples, one or more of the systems 102, 104 is implemented by a dedicated server or other computing device, such as a field programmable gate array (FPGA), an application specific integrated circuit (ASIC), etc. Also, in some examples, one or more of the systems 102, 104 may be implemented as software executed by one or more computing devices of the security system 101.

FIG. 2 also shows a data protection database 107 in communication with the security system 101. For example, data protection database 107 may be implemented according to a database schema that includes tables for the tables 108, 110, 112, 114, 116, 117, 119 described at FIG. 1. The database 107, however, is just one example way for implementing the tables 108, 110, 112, 114, 116, 117, 119. In other examples, tables 108, 110, 112, 114, 116, 117, 119 may be implemented as files in a file system, separate data stores, etc.

Providing systems 130A, 130B 130C may provide input files and/or input records to the input system 102. Providing systems may comprise any suitable computing device or devices. In some examples where the processing system 102 implements receivables management processing, the providing system 130A may be payment management system of a customer of a financial services institution or other entity implementing the processing system 102. Receiving systems 132A, 132B, 132C may similarly comprise one or more computing devices (e.g., servers). Receiving systems 132A, 132B, 132C may receive output files and/or records generated by the output system 104. In some examples where the processing system 102 implements payroll processing, receiving systems 132A, 132B, 132C may include systems associated with employee banks that receive direct deposits on behalf of employees. In some examples, the security system 101 may both receive input files from and provide output files to the same system (e.g., a providing system 130A, 130B, 130C or receiving system 132A, 132B, 132C).

The various components 130A, 130B, 130C, 1022, 101, 107, 132A, 132B, 132C, of the environment 100 may be in communication with one another via a network 140. The network 140 may be or comprise any suitable network element operated according to any suitable network protocol. For example, one or more portions of network 140 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 3:
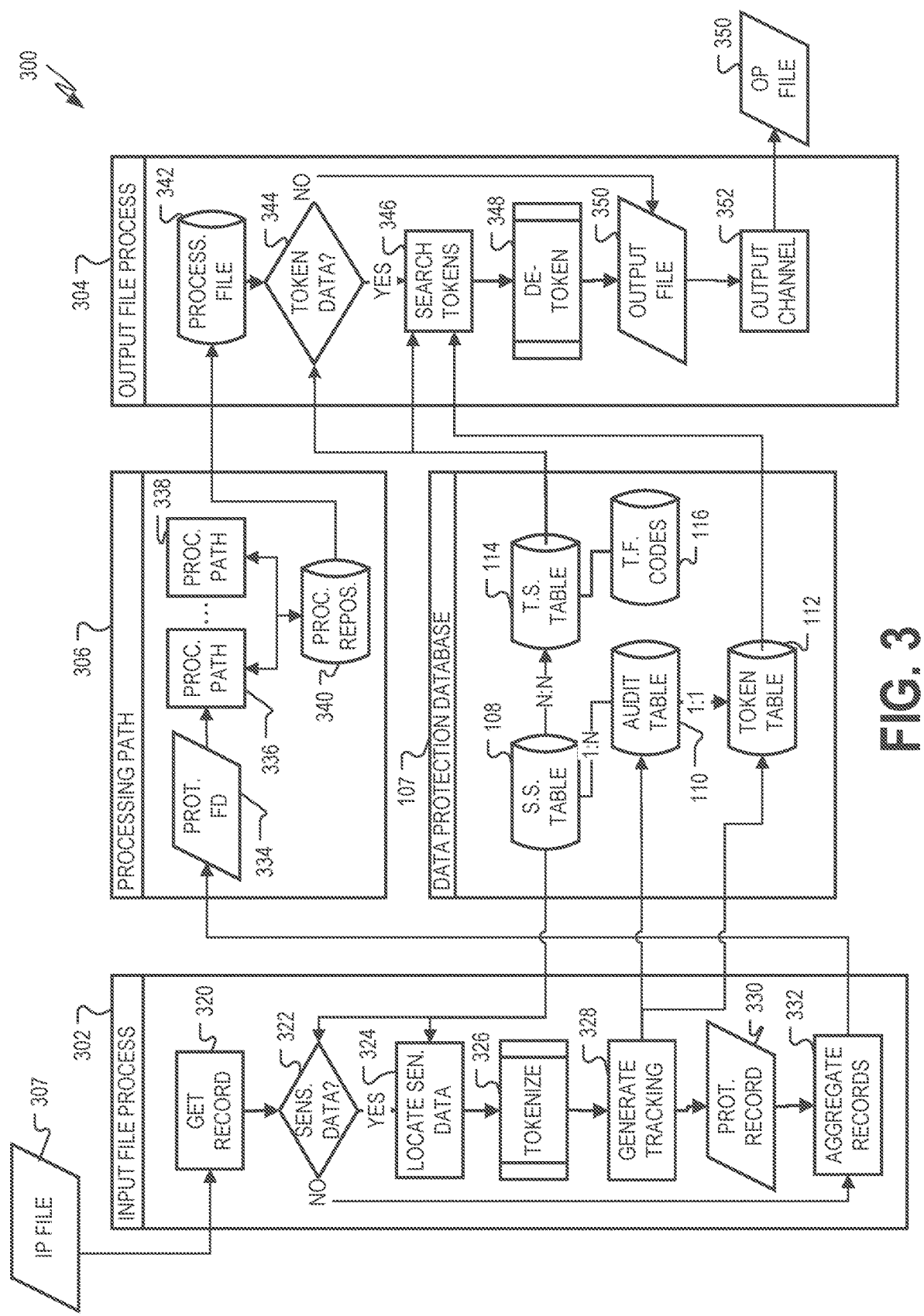
FIG. 3 is a workflow diagram showing an example workflow that may be executed by the security system and processing system of FIG. 1 for security data processing.

FIG. 3 is a workflow diagram showing an example workflow 300 that may be executed by the security system 101 and processing system 104 of FIG. 1 for security data processing. The workflow 300 includes an input file process 302, which may be executed by the input system 102, and an output file process 304, which may be executed by the output system 104. A processing path 306 may be executed by the processing system 104. The workflow 300 also shows a data protection database 308. The data protection database 308 may include a source setup table 108, an audit table 110, the token table 112, the target setup table 114 and the target format table 116. For example, the workflow 300 shows one example implementation in which the tables 108, 110, 112, 114, 116, 117, 119 are implemented as tables in a database.

Referring now to the input file process 302, the input system 102 may receive an input file 307. The input file 307 may include input records, for example, may correspond to the input file 118 shown in FIG. 1. At operation 320, the input system 102 may get an input record from the input file 307. Although the workflow flow 300 has the input system 102 operating on one input record at a time, in some examples, the input system 102 may operate on multiple input records in parallel.

At operation 322, the input system 102 may determine whether the input record includes sensitive data. For example, the input system 102 may retrieve a source setup record corresponding to the input record from the source setup database 308. If the source setup record indicates that the input record does not include sensitive data, the input system 102 may proceed to operation 332 described below. If the source setup record indicates that the input record does include sensitive data, the input system may locate the sensitive data in the input record at operation 324. For example, the source setup record for the input record received from the source setup table 108 may indicate one or more record fields that include sensitive data. Although the example of FIG. 1 shows records in which only one record field includes sensitive data, in some examples, an input record may comprise more than one record field including sensitive data.

At operation 326, the input system 102 may tokenize the input record, for example, by generating token data to replace sensitive data, for example, as illustrated in FIG. 1.

Tokenized data may be generated in any suitable manner. In some examples, the input system 102 may apply a hash algorithm to sensitive data to generate corresponding token data. In some examples, the input system may utilize an external token utility, such as the HPE Secure Stateless Tokenization utility available from Hewlett Packard Enterprise. Other suitable tokenization utilities that may be used include, the CardVault® utility available from 3Delta Systems, Inc., the Cloud Data Protection utility available from Blue Coat Systems, Inc., the Tokenization utility available from Bluefin Payment Systems, the CardConnect utility from CardConnect LLC, etc.

At operation 328, the input system 102 may generate tracking data. For example, the input system 102 may generate an audit record for storage at the audit table 110 and/or a token record for storage at the token table 112. The protected (e.g., tokenized) record 330 is shown. At operation 332, the input system 102 may aggregate records into a protected file 334, which may be provided to the processing path 306.

The processing path 306 may receive the protected file 334 and execute one or more processing paths 336, 338. Processing paths may perform any suitable task including, for example, generating receivable records from input records, generating paycheck or direct deposit records describing payroll transactions, etc. Processing paths may utilize one or more processing repositories 340. For example, processed files, including processed records, may be stored at the processing repository 340.

Referring now to the output file process 304, the output system 104 may receive a processed file 342. The processed 342 file may (or may not) include tokenized fields. Although the output file process 304 is described in terms of a process file, in some examples, the output system 104 may operate on a record-by-record basis. For example, the output file process 304 may be performed individual on a plurality of records that may subsequently be aggregated into an output file 354.

In some examples, the processed file 342 is similar to the processed file 122 shown in FIG. 1. At operation 344, the output system 104 may determine whether the processed file 342 includes token data. For example, the processed file 342 may include token data, for example, if it includes one or more record fields derived from input records that were tokenized on input. Determining whether the processed file 342 includes token data may include, for example, referring to the target source table 114 and/or target format code table 116. In some examples, the processed file 342 includes metadata that may be used to query for matching target setup records at the target setup table 114. If a target setup record is referenced, the target setup record may be retrieved from the target setup table 114. The target setup record may include information that identifies the processed file 342 and/or the metadata used to query the target setup table 114. The target setup record may also include data describing records at the processed file 342 that include tokens. The security system 101 may search the processed file 342 for tokens.

For example, the output system 104 may retrieve a target format code corresponding to one or more of the processed records at the processed file 342. In some examples, the target format code may be selected based on the metadata used to select the target setup record. For example, the target format code may indicate a number of record fields, an order of record fields, a type of data expected in record fields, etc., in the processed record. The target format code may be utilized as a key to apply the target setup record to identify token data in the processed file. The target setup record may indicate record fields, if any, at the processed records of the processed file 342 that include token data. The target format code may define the record fields referenced by the target setup record.

If the processed file does not include token data, the output system 104 may proceed to provide the output file 350 via an output channel 352, described in more detail below. If the processed file does include token data, the output system 104 may, at operation 346, verify token data at the processed file, for example, by comparing data units from record fields indicated by the target setup record to include sensitive data with entries in the token table 112. For example, when the relevant record fields were tokenized at the input file process, the corresponding token data may have been written to the token table 112 as described. If, at operation 346, the token table includes a copy of the data units indicated by the target setup record to be token data, it may provide another indication that the data units are, indeed, token data. In some examples, as described herein, the token records at the token table 112 may expire after an expiration time. If the output file process 304 is executed after the expiration of a token record corresponding to the processed record, the output system 104 may refer to the audit table 110 to receive an audit record that may include the token data.

At operation 348, the output system 104 may de-tokenize the processed records. For example, token data at various record fields may be replaced with corresponding token data that was removed at operation 326 by the input system 102. In some examples, de-tokenizing may include a call to a token utility, such as the HPE Secure Stateless Tokenization utility available from Hewlett Packard Enterprise. The result may be an output file 350, which may correspond to the output file 124 shown in FIG. 1. The output file 350 may be provided to a subsequent system via an output channel 352. The output channel 352 may be any suitable communication channel including, for example, an e-mail, a File Transfer Protocol (FTP) transfer, secure or SSH File Transfer Protocol (S/FTP), Hypertext Transfer Protocol (HTTP), secure or SSH Hypertest Transfer Protocol (HTTP/S), Connect:Direct (also know as Network Data Mover or NDM), Message Queue (MQ), Remote Copy (RCP), Society for Worldwide Interbank Financial Telecommunication network (SWIFT-Net), etc. The data protection database 107 shown in FIG. 3 omits the source maintenance table 117 and the target maintenance table 119, although these tables 117, 119 may be included in various examples.

Figure 4:
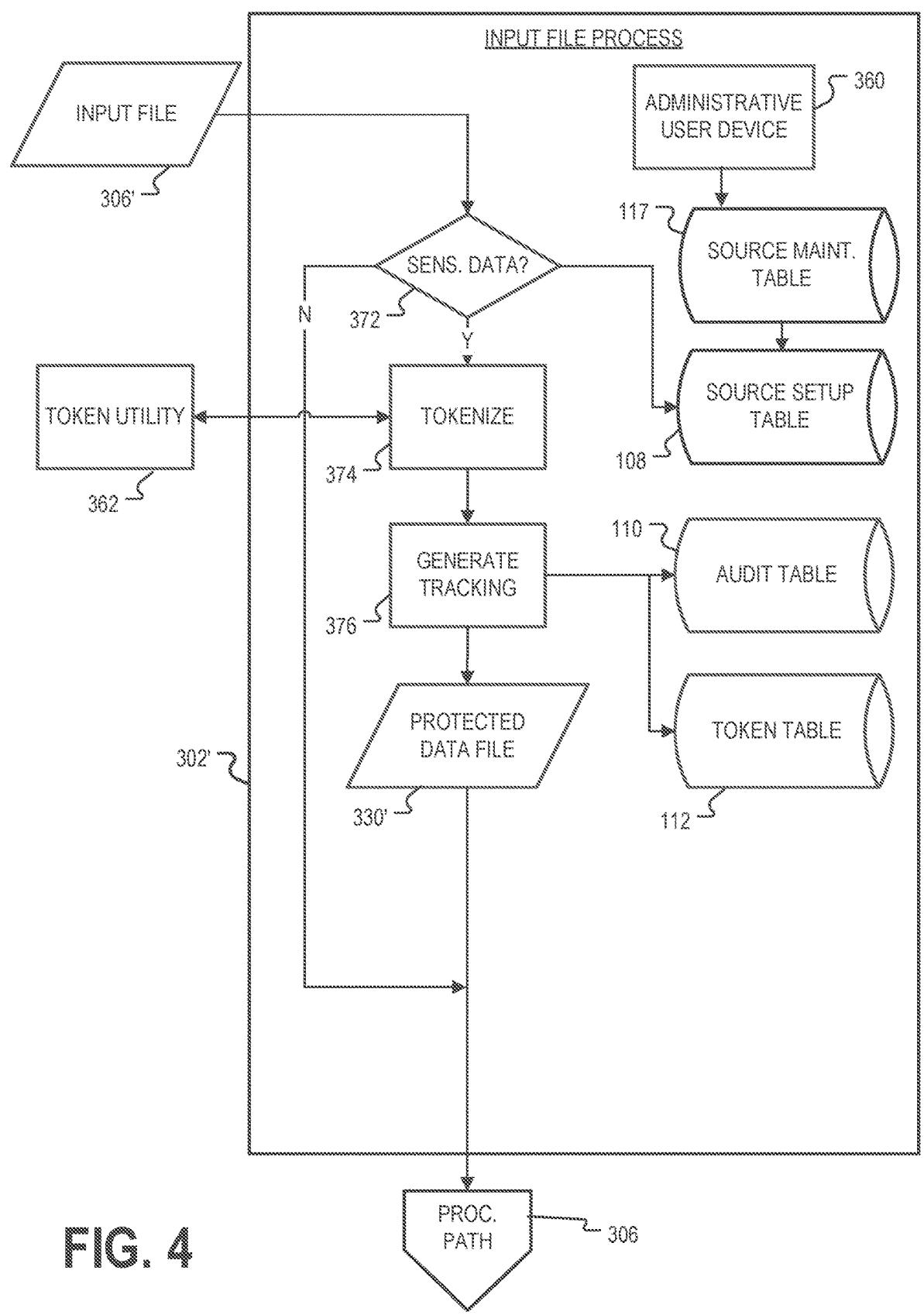
FIG. 4 is a workflow diagram showing another example of an input file process that may be executed by the input system of the environment of FIG. 1.

FIG. 4 is a workflow diagram showing another example of an input file process 302' that may be executed by the input system 102 of the environment 100. For example, the input file process 302' shows an example variation of the input file process 302 shown in FIG. 3. In some examples, features of the input file process 302 and the input file process 302' may be combined in any suitable way.

In the example of FIG. 4, an input file 307' is received by the input system 102. The input system 102 may process the input records making up the input file 307' in parallel. For example, the input file process 302' may be suitable for input files 306' that include input records of the same type or format. For example, all or most of the input records included in the input file 307' may have the same organization of record fields such that the input records include sensitive data (or do not include sensitive data) at the same record fields. At operation 372, the input system 102 may determine if the input records of the input file 307' include sensitive data, for example, by obtaining a source setup record corresponding to the input file 307' and/or an input record or set of input records included in the input file 307'. FIG. 4 also shows an administrative user computing device 360 in communication with the source setup table 108 and optional source maintenance table 117. The administrative user computing device 360 may be any suitable type of computing device including, for example, a laptop computer, a desktop computer, a tablet computer, a smart phone, etc. In some examples, an administrative user may utilize the administrative user computing device 360 to build and/or update the source setup table 108. For example, the administrative user may receive input records and/or data describing input records to be received by the input system. The administrative user may identify data fields that include sensitive data. The administrative user may create source setup records for the input records to be received by the input system. In this way, when the input records are received, the input system may identify the corresponding source setup record to identify sensitive data, as described herein. In the example shown in FIG. 4, the administrative user may describe proposed new source setup records at source setup update records stored at the source maintenance table 117. The source setup update records may be reviewed, as described herein. The administrative user computing device 360, in some examples, may also be used by an administrative user to modify and/or delete existing source setup records.

In some examples, the input system 102 may be programmed to automatically generate some or all of the source setup records of the source setup table. For example, the input system 102 may be programmed to identify patterns associated with sensitive data such as, for example, the 3-2-4 digit pattern of Social Security numbers, common patterns for credit card numbers, etc.

Source setup records stored at the source setup table 108, as described herein, may include data describing record fields at input records that include sensitive data. Source setup records, whether generated by an administrative user or automatically, may include record fields describing the input file 307'. Various example record fields that may be included in a source setup record are described below.

A file source field may indicate a source of the input file 307'. The file source field may also indicate a processing path or service to which the input file 307' is to be provided. For example, different processing paths 336, 338 (FIG. 3) of the processing path 306 may provide different services (e.g., receivables management, payroll, etc.) A customer identification field may indicate the name of the customer sending the input file 307'. A sequence number field may indicate the position of the input file 307' in a sequence of received input files. A sequence number field may indicate the position of the input file 307' in a sequence of received input files. A record type field may indicate the type of the record (e.g., transaction, payroll data, etc.). A record type position field may indicate the position of records in the input records of the input file 307'. A protection identification field may identify record fields of the input records of the input file 307' that include sensitive data and, therefore, are to be protected. A protection type field may indicate the type of protection to be applied to different record fields. Example protection types include tokenization, encryption, or tokenization and encryption. A field position field may indicate the position of various record fields in the input records of the input file 307'. A field length field may indicate the length of various record fields in the input records of the input file. A transmission identification record field may indicate a transmission in which the input file 307' was received. For example, a customer of a financial services institution implementing processing system 104 may send input files 306' including input records describing transactions on a periodic basis (e.g., monthly). A billing account number field may indicate, for example, an account (of the customer) to which the transactions indicated by the input records are payable.

At operation 374, the input system 102 may tokenize the input file 307'. For example, the input system 102 may call a token utility 362, such as the HPE Secure Stateless Tokenization utility available from Hewlett Packard Enterprise. At operation 376, the input system 102 may generate tracking records for the tokenization at operation 374. For example, the input system 102 may generate an audit record for the file. The audit record may include record fields similar to the source setup record described above such as, for example, transmission identification, file source, sequence number, customer identification, protection identification number, etc. In some examples, the audit record may also include additional data describing the tokenization operation 374 such as, for example, a timestamp record field indicating when the tokenization operation occurred, and a token field including the token data that was written to the input records of the input file 307'.

At the tracking operation 376 (and/or at a separate operation) the input system 102 may also generate a token record for storage at the token table 112. The token record may include various record fields including fields similar to those of the source setup record and audit record, such as a transmission identification field, a protection identification field, a billing account number field. The token record may also include an insert/update timestamp field indicating a time when the tokenization operation 374 was performed and/or a time when the token record is added to the token table 112. In some examples, a token record also includes an output/retrieval timestamp field. This record field, which may be blank at the time that the token record is created, may be completed by the output system 104 during detokenization. In some examples, as described, the token record may be configured to expire after a predetermined expiration time. After tokenization, a protected file 330' may be provided to the processing path 306, for example, as shown in FIG. 3.

Figure 5:
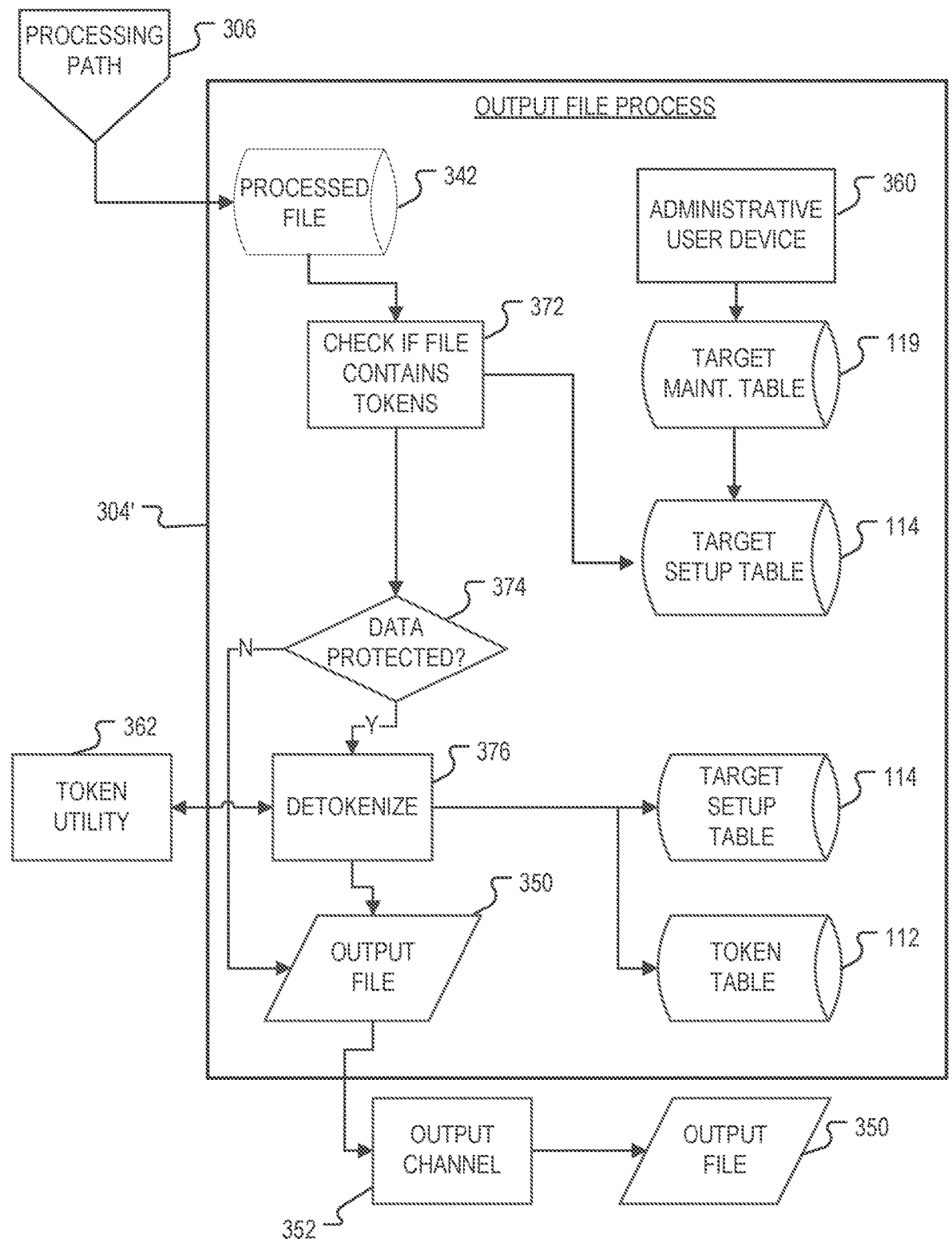
FIG. 5 is a workflow diagram showing another example of an output file process that may be executed by the output system of the environment of FIG. 1.

FIG. 5 is a workflow diagram showing another example of an output file process 304' that may be executed by the output system 104 of the environment 100. For example, the output file process 304' shows an example variation of the output file process 304 shown in FIG. 3. In some examples, features of the output file process 304 and the output file process 304' may be combined in any suitable way.

FIG. 5 is a workflow diagram showing another example of the output file process 304 of the workflow 300 of FIG. 3. In the example of FIG. 5, the output file process 304 begins upon receiving a processed file 342 including processed records from the processing path 306 of the processing system 104. At operation 372, the output system 104 may determine if the processed file 342 (e.g., the processed records therein) includes token data. For example, the output system 106 may retrieve a target setup record corresponding to the processed file and/or a set of processed records included in the processed file from the target setup table 112 and/or a target format code from the target format codes table 116. For example, the processed file 342 may comprise metadata including a name or other identifier that uniquely identifies the processed file 342 and/or some or all of the processed records included in the processed file 342. In some examples, the identifier is a transmission identifier carried over from an input file that is or has been processed to create the processed file 342.

The target setup table 114 (e.g., a database management system for a database including the table 114) may return the target setup record corresponding to the processed file 342 and/or a set of records included in the processed file 342. In some examples, the target setup record may include record fields describing processed records at the processed file 342. The record fields of the target setup record may include, for example, a transmission identification field, a sequence number field, a customer name field, a protection type, a record type, a record type position, a field position field, etc.

In some examples, the target setup record may additionally or alternatively include a delimiter field. A delimiter field may describe delimiters that may be included in a record field or fields of one or more processed records of the processed file 342. Delimiters may include, for example, quotation marks, commas, tabs, or any other character placed between portions of a text string. A file target format may describe a format that the processed file should have to be compatible with the appropriate receiving system. Example formats include Fixed Length, Delimited, Extensible Markup Language (XML), Hypertext Markup Language (HTML), Microsoft Excel (XLS), Portable Document Format (PDF), Electronic Data Interchange (EDI), etc.

Also, in some examples, such as examples where the processing system 104 implements an accounts receivable service, target setup record for a processed file 342 or processed records therein may also include a billing account number field indicating an account to which receivables are to be paid.

In some examples, a target format code record for the processed file 342 and/or processed records thereof may indicate a target format code that indicates the target setup record for the processed file 342 and/or processed records thereon. A target format record may also, in some examples, include a description of the processed file 342 and/or records thereof and a timestamp field to be filled-in at a time when the output system 104 identifies the target format record with a processed file 342 or processed records thereof. For example, the output system 104 may match the data at the description field to the processed file 342 or processed records thereof and then utilize the code stored at the corresponding code field to retrieve the target setup record for the processed file 342 or processed records thereof. At operation 376, the output system 104 may de-tokenize the processed file 342 to generate the output file 350. For example, the output system 104 may call a token utility 362, as described above. The output file 350 may be provided to a receiving system via the output channel 352.

FIG. 5, similar to FIG. 4, shows an administrative user computing device 360. For example, an administrative user may utilize the administrative user computing device 360 to generate and/or modify target setup records and/or target format code records. In the example shown in FIG. 5, the administrative user may describe proposed new target setup records at target setup update records stored at the target maintenance table 119. The target setup update records may be reviewed, as described herein. The administrative user computing device 360, in some examples, may also be used by an administrative user to modify and/or delete existing target setup records.

Figure 6:
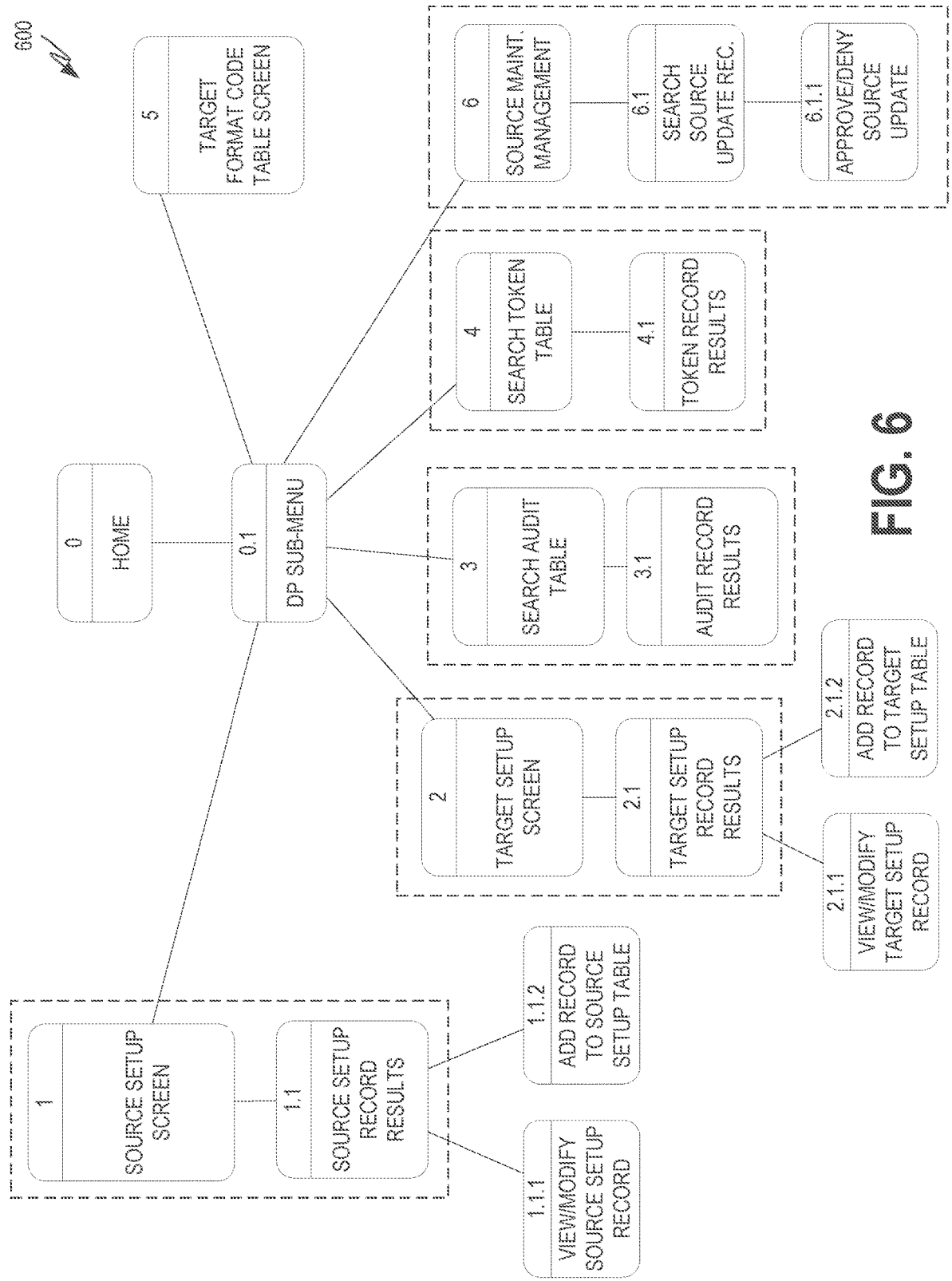
FIG. 6 is an interface map showing examples screens of an administrative interface that may be provided to an administrative user by the security system to view, generate, and/or modify entries to the various tables described herein.

FIG. 6 is an interface map showing examples screens of an administrative interface 600 that may be provided to an administrative user (e.g., via the administrative user computing device 360) by the security system 101 to view, generate, and/or modify records at the source setup table 108, the audit table 110, the token table 112 target setup table 114, and/or the target format code table 116. A home screen 0 may be provided to an administrative user upon login to the administrative interface 600. The home screen 0 may include a hyperlink to a data protection sub-menu 0.1 screen. A hyperlink may be an alphanumeric or graphical item on a current screen that, when selected by the administrative user, causes the interface 600 to display a target screen either instead of or in addition to the current screen. In some examples the home screen 0 may also include links to other screens for performing administrative tasks in the environment 100. For example, other links at the home screen 0 may lead to other administrative interface screens enabling the administrative user to perform administrative tasks related to the processing of the processing system 104.

The data protection sub-menu screen 0.1 may include hyperlinks to various other screens including a source setup screen 1, a target setup screen 2, a search audit table screen 3, a search token table screen 4, an add/modify target format code table screen 5 and/or a source maintenance management screen 6. The source setup screen 1 may comprise functionality allowing the administrative user to search the source setup table 108 to modify and/or add source setup records. For example, the source setup screen 1 may comprise fields for receiving source setup table search terms. Search terms may include, for example, values for any record fields of source setup records such as, for example, file source, customer identification type (e.g., process type), customer identification, etc.

When search terms are provided, the security system 101 may search the source setup table and return source setup records that match the search terms. Returned source setup records may be provided, for example, in tabular form at a source setup record results screen 1.1. An example tabular list of source setup records is in response to search terms is given below in TABLE 1. As described above, a setup table record may correspond to an input file and/or an input record or set of input records in an input file.

TABLE 1

| ACCNT NO | Source File | CustID Type | CustID Value | Source SeqNo | Protection Type | Partner RoutingID |
|---|---|---|---|---|---|---|
| AA1 | FILE1 | PP1 | 1234 | 01 | TOKEN | 12309 |
| AC3 | FILE2 | PP2 | 3085 | 01 | TOKEN | 29843 |
| AD9 | FILE3 | PP1 | 0380 | 07 | TOKEN | 19298 |

In TABLE 1, each row may represent a source setup record while each column may represent a record field in the source setup record. The customer identifier value, source sequence number, and protection type fields are described above. An ACCNT NO or Account Number field may include data units describing an account to which the record refers. The customer identifier type field may describe, for example, a processing path 336, 338 or processing service utilized by the customer providing the record or file. A partner routing identification field may indicate, for example, a providing system providing an input file.

From the source setup record results screen 1.1, the administrative user may select a source setup record from the tabular display and view or make modifications to the selected source setup record at a view/modify source setup record screen 1.1.1. Alternatively, the source setup records results screen 1.1 may comprise a button or other hyperlink to an add record to source setup table screen 1.1.2, which may include fields allowing the administrative user to add a new source setup record to the source setup table 108. In some examples, the source setup screen 1 may include a hyperlink directly to the add record to source setup table screen 1.1.2 allowing the administrative user to add a source setup record without first performing a search. The administrative user, via an administrative user computing device, may provide data describing the desired source setup record, such as, for example as described above at TABLE 1. The security system 101 may generate the source setup record from the received data, for example, by formatting the data (e.g., as shown at TABLE 1) and storing the resulting record at the source setup table 108. In some examples, the security system 101 may generate a source setup update record stored at the source maintenance table 117, which may later be reviewed and (potentially) approved before a new source setup record is created or changes to an existing source setup record are made.

The data protection sub-menu screen 0.1 may also include a hyperlink to a target setup screen 2 for searching, viewing, and/or modifying target setup records from the target setup table 114. For example, the target setup screen 2 may include fields for receiving search terms to search the target setup table 114. Upon receiving search terms, the security system 101 may search the target setup table 114 and provide target setup records matching the search terms, for example, in tabular form at target setup record results screen 2.1. An example tabular list of source setup records is in response to search terms is given below in TABLE 2.

TABLE 2

| ACNT. NO | Transmission ID | Seq No. | Target Format | Customer Name | Protection Type | Record Type |
|---|---|---|---|---|---|---|
| AA1 | AASLKFD | 01 | Fm1 | Corp. 1 | TOKEN | NTE |
| AC3 | ASDF098N | 03 | Fm3 | Corp. 2 | TOKEN | REF |
| AD9 | LASDFIA7 | 02 | Fm8 | Corp. 3 | TOKEN | NTE |

The administrative user may select one or more of the target setup records for viewing or modification, for example, to launch a view/modify target setup record screen 2.1.1, which may include fields for receiving modifications to the selected target setup record. Also, the target setup record results screen 2.1 and/or the target setup screen 2 may include a hyperlink to an add record to target setup table screen 2.1.2, which may include fields for receiving record field values to add a new target setup record to the target setup table 114. The administrative user, via an administrative user computing device, may provide data describing the desired target setup record, such as, for example as described above at TABLE 1. The security system 101 may generate the target setup record from the received data, for example, by formatting the data (e.g., as shown at TABLE 2) and storing the resulting record at the target setup table 114. In some examples, the security system 101 may generate a target setup update record stored at the target maintenance table 119, which may later be reviewed and (potentially) approved before a new target setup record is created or changes to an existing target setup record are made.

The data protection sub-menu screen 0.1 may also, in some examples, include a link to a search audit table screen 3. The search audit table screen 3 may receive search terms from the administrative user and return corresponding audit records from the audit table 110, for example, in tabular form at audit record results table 3.1. The data protection sub-menu screen 0.1 may also, in some examples, include a link to a search token table screen 4. The search token table screen 4 may receive search terms from the administrative user and return corresponding token records from the token table 112, for example, in tabular form at token record results table 4.1. The data protection sub-menu 0.1, in some examples, may also include a hyperlink to a target format code table screen 5. At the target format code table screen, the administrative user may search and/or modify target format code records from the target format code table 116.

In some examples, the data protection sub-menu screen 0.1 may also include a link to a source maintenance management screen 6. The source maintenance management screen 6 may receive search parameters that allow the administrative user to search source update records stored at the source maintenance table 117, for example, in tabular format, as screen 6.1. The user may select one or more source update records from the screen at 6.1, which may cause the security system to display an approve/reject screen 6.1.1 from which the administrative user may either approve or reject the change to the source setup record described by the selected source update record or records.

Figure 7:
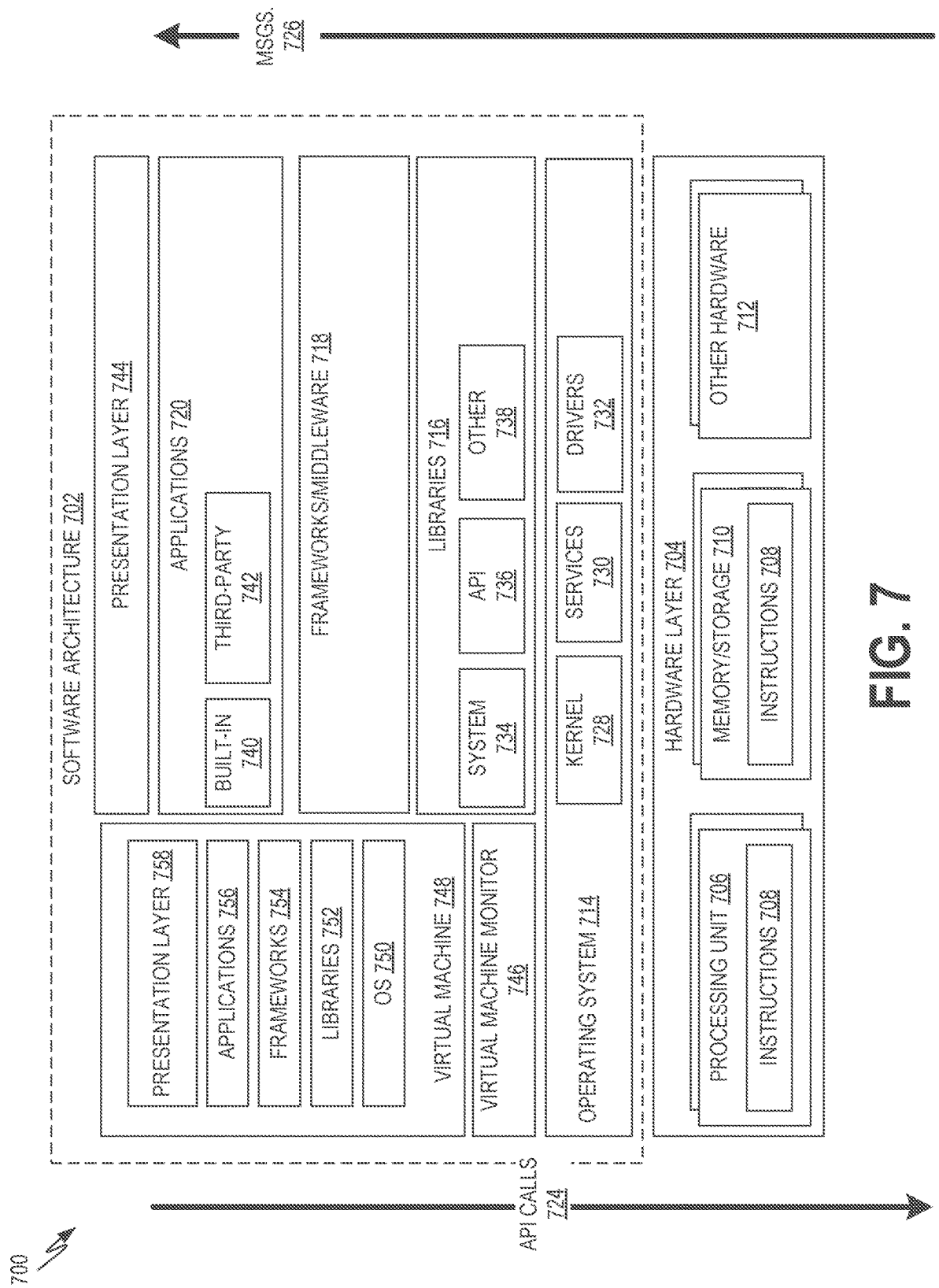
FIG. 7 is a block diagram showing one example of a software architecture for a computing device.

FIG. 7 is a block diagram 700 showing one example of a software architecture 702 for a computing device. The architecture 702 maybe used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture 700 of FIG. 7 and/or the architecture 800 of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth of FIGS. 1-7. Hardware layer 704 also includes memory and/or storage modules 710, which also have executable instructions 708. Hardware layer 704 may also comprise other hardware as indicated by other hardware 712 which represents any other hardware of the hardware layer 704, such as the other hardware illustrated as part of hardware architecture 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is received. For example, when an alert message is pushed to a computing device arranged according to the architecture 702, it may include or trigger an interrupt. An interrupt service may cause the architecture 700 to execute an ISR that launches an appropriate UI and display the received alert message.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. For example, the security system 101, processing system 104, etc., may be executed on one or more virtual machines executed at one or more server computing machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 can be the same as corresponding layers previously described or may be different.

Figure 8:
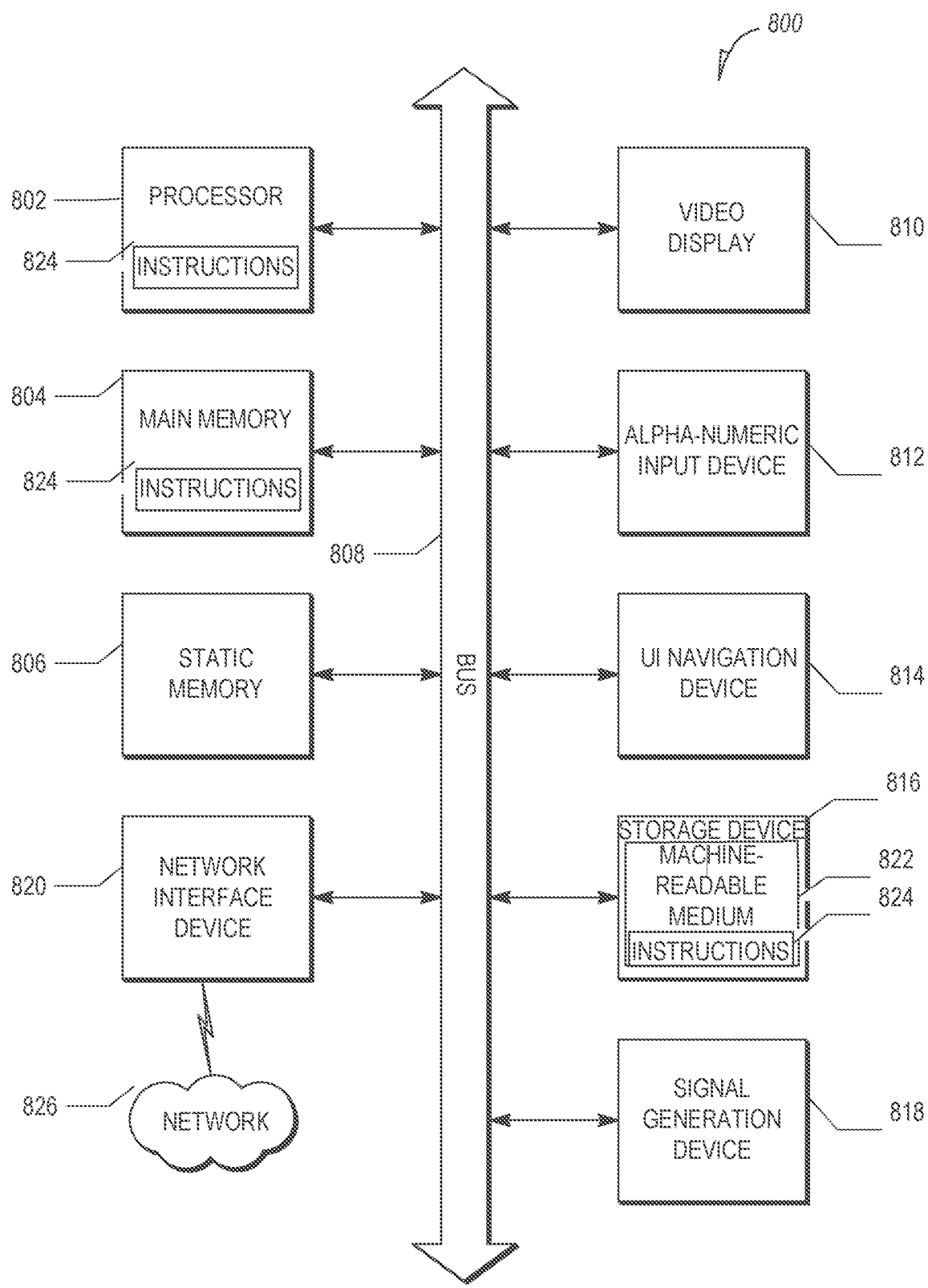
FIG. 8 is a block diagram illustrating a computing device hardware architecture, within which a set or sequence of instructions can be executed to cause the machine to perform examples of any one of the methodologies discussed herein.

FIG. 8 is a block diagram illustrating a computing device hardware architecture 800, within which a set or sequence of instructions can be executed to cause the machine to perform examples of any one of the methodologies discussed herein. For example, the architecture 800 may execute the software architecture 702 described with respect to FIG. 7. The architecture 800 may operate as a standalone device or may be connected (e.g., networked) to other machines. In a networked deployment, the architecture 800 may operate in the capacity of either a server or a client machine in server-client network environments, or it may act as a peer machine in peer-to-peer (or distributed) network environments. The architecture 800 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 800 includes a processor unit 802 comprising at least one processor (e.g., a central processing unit (CPU), a graphics processing unit (GPU) or both, processor cores, compute nodes, etc.). The architecture 800 may further comprise a main memory 804 and a static memory 806, which communicate with each other via a link 808 (e.g., bus). The architecture 800 can further include a video display unit 810, an alphanumeric input device 812 (e.g., a keyboard), and a user interface (UI) navigation device 814 (e.g., a mouse). In some examples, the video display unit 810, input device 812 and UI navigation device 814 are incorporated into a touch screen display. The architecture 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

In some examples, the processor unit 802 or other suitable hardware component may support a hardware interrupt. In response to a hardware interrupt, the processor unit 802 may pause its processing and execute an interrupt service routine (ISR). For example, an alert message may include and/or trigger a hardware interrupt. The ISR for the hardware interrupt may launch the appropriate UI (e.g. UI 132 or 134) and display the received alert message.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the architecture 800, with the main memory 804, static memory 806, and the processor 802 also constituting machine-readable media. Instructions stored at the machine-readable medium 822 may include, for example, instructions for implementing the software architecture 702, instructions for executing any of the features described herein, etc.

While the machine-readable medium 822 is illustrated in an example to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for securing data, the system comprising:
    a computing device comprising at least one processor and a memory in communication with the at least one processor, wherein the computing device is programmed to perform operations comprising:
    serving a user interface screen to a user;
    receiving a selection of a hyperlink at the user interface screen;
    responsive to receiving the selection of the hyperlink, prompting the user to provide source setup data describing a first source setup record;
    receiving a first record comprising a plurality of record fields, the plurality of record fields comprising a first record field, the first record field comprising a first record field data;
    determining that the first source setup record corresponds to the first record; and
    tokenizing the first record field based at least in part on the first source setup record.

2. The system of claim 1, the operations further comprising, before tokenizing the first record field of the plurality of record fields of the first record, receiving approval data indicating that the first source setup record is approved.

3. The system of claim 1, the operations further comprising:
    determining that the first source setup record comprises data referencing the first record field;
    receiving first token data corresponding to the first record field data;
    replacing the first record field data at the first record field with the first token data;
    storing the first token data to a token record of a token table; and
    writing the first token data to the first record field to replace the first record field data.

4. The system of claim 3, wherein the token record comprises an expiration period after which the token record is removed from the token table.

5. The system of claim 1, the operations further comprising:
    serving a second user interface screen to the user, the second user interface screen comprising a plurality of source setup data records from a source setup table;
    receiving source setup record modification data;
    modifying a second source setup record using the source setup record modification data to generate a modified second source setup record;
    receiving a second record comprising a plurality of record fields of the second record;
    determining that the modified second source setup record corresponds to the second record; and
    tokenizing a first record field of the plurality of record fields of the second record based at least in part on the modified second source setup record.

6. The system of claim 5, the operations further comprising:
    receiving an input file comprising the first record and a second record; and
    after tokenizing the first record field of the plurality of record fields of the first record, aggregating the first record and the second record to form a protected file.

7. The system of claim 1, the operations further comprising:
    serving a third user interface screen to a user;
    receiving a selection of a hyperlink at the third user interface screen;
    responsive to receiving the selection of the hyperlink, prompting the user to provide target setup data describing a first target setup record;
    receiving a first processed record comprising a plurality of record fields, the plurality of record fields comprising a first record field;
    determining that the first target setup record corresponds to the first processed record; and
    detokenizing a first record field of the plurality of record fields of the first processed record based at least in part on first target setup record.

8. The system of claim 7, the operations further comprising:
    determining that first token data stored at a token table corresponds to first record field data at the first record field of the plurality of record fields of the first processed record;
    calling a token utility to generate replacement first record field data; and
    writing the replacement first record field data to the first record field of the plurality of record fields of the first processed record.

9. A method for securing data, the method comprising:
    serving a user interface screen to a user;
    receiving a selection of a hyperlink at the user interface screen;
    responsive to receiving the selection of the hyperlink, prompting the user to provide source setup data describing a first source setup record;
    receiving a first record comprising a plurality of record fields, the plurality of record fields comprising a first record field, the first record field comprising a first record field data;
    determining that the first source setup record corresponds to the first record; and
    tokenizing the first record field based at least in part on the first source setup record.

10. The method of claim 9, further comprising, before tokenizing the first record field of the plurality of record fields of the first record, receiving approval data indicating that the first source setup record is approved.

11. The method of claim 9, further comprising:
   determining that the first source setup record comprises data referencing the first record field;
   receiving first token data corresponding to the first record field data;
   replacing the first record field data at the first record field with the first token data;
   storing the first token data to a token record of a token table; and
   writing the first token data to the first record field to replace the first record field data.

12. The method of claim 11, wherein the token record comprises an expiration period after which the token record is removed from the token table.

13. The method of claim 9, further comprising:
   serving a second user interface screen to the user, the second user interface screen comprising a plurality of source setup data records from a source setup table;
   receiving source setup record modification data;
   modifying a second source setup record using the source setup record modification data to generate a modified second source setup record;
   receiving a second record comprising a plurality of record fields of the second record;
   determining that the modified second source setup record corresponds to the second record; and
   tokenizing a first record field of the plurality of record fields of the second record based at least in part on the modified second source setup record.

14. The method of claim 13, further comprising:
   receiving an input file comprising the first record and a second record; and
   after tokenizing the first record field of the plurality of record fields of the first record, aggregating the first record and the second record to form a protected file.

15. The method of claim 9, further comprising:
   serving a third user interface screen to a user;
   receiving a selection of a hyperlink at the third user interface screen;
   responsive to receiving the selection of the hyperlink, prompting the user to provide target setup data describing a first target setup record;
   receiving a first processed record comprising a plurality of record fields, the plurality of record fields comprising a first record field;
   determining that the first target setup record corresponds to the first processed record; and
   detokenizing a first record field of the plurality of record fields of the first processed record based at least in part on first target setup record.

16. The method of claim 15, further comprising:
   determining that first token data stored at a token table corresponds to first record field data at the first record field of the plurality of record fields of the first processed record;
   calling a token utility to generate replacement first record field data; and
   writing the replacement first record field data to the first record field of the plurality of record fields of the first processed record.

17. A non-transitory computer-readable medium comprising instructions therein that, when executed by at least one processor, cause the at least one processor to perform operations comprising:
   serving a user interface screen to a user;
   receiving a selection of a hyperlink at the user interface screen;
   responsive to receiving the selection of the hyperlink, prompting the user to provide source setup data describing a first source setup record;
   receiving a first record comprising a plurality of record fields, the plurality of record fields comprising a first record field, the first record field comprising a first record field data;
   determining that the first source setup record corresponds to the first record; and
   tokenizing the first record field based at least in part on first source setup record.

18. The medium of claim 17, the operations further comprising:
   determining that the first source setup record comprises data referencing the first record field;
   receiving first token data corresponding to the first record field data;
   replacing the first record field data at the first record field with the first token data;
   storing the first token data to a token record of a token table; and
   writing the first token data to the first record field to replace the first record field data.

19. The medium of claim 17, the operations further comprising:
   serving a second user interface screen to the user, the second user interface screen comprising a plurality of source setup data records from a source setup table;
   receiving source setup record modification data;
   modifying a second source setup record using the source setup record modification data to generate a modified second source setup record;
   receiving a second record comprising a plurality of record fields of the second record;
   determining that the modified second source setup record corresponds to the second record; and
   tokenizing a first record field of the plurality of record fields of the second record based at least in part on the modified second source setup record.

20. The medium of claim 17, the operations further comprising:
   serving a third user interface screen to a user;
   receiving a selection of a hyperlink at the third user interface screen;
   responsive to receiving the selection of the hyperlink, prompting the user to provide target setup data describing a first target setup record;
   receiving a first processed record comprising a plurality of record fields, the plurality of record fields comprising a first record field;
   determining that the first target setup record corresponds to the first processed record; and
   detokenizing a first record field of the plurality of record fields of the first processed record based at least in part on first target setup record.

* * * * *